United States Patent [19]
Shon

[11] Patent Number: 6,119,446
[45] Date of Patent: Sep. 19, 2000

[54] METHOD FOR CONTROLLING GAS TURBINE USING FUZZY LOGIC

[75] Inventor: Young-chang Shon, Changwon, Rep. of Korea

[73] Assignee: Samsung Aerospace Industries, Ltd., Kyungsangnam-Do, Rep. of Korea

[21] Appl. No.: 09/187,753

[22] Filed: Nov. 9, 1998

[30] Foreign Application Priority Data

Nov. 10, 1997 [KR] Rep. of Korea ............ 97-59081

[51] Int. Cl.$^7$ .................................................. F02C 9/28
[52] U.S. Cl. .................................. 60/39.03; 60/39.282
[58] Field of Search ........................ 60/39.03, 39.281, 60/39.282

[56] References Cited

U.S. PATENT DOCUMENTS

| | | | |
|---|---|---|---|
| 4,693,077 | 9/1987 | Skarvan et al. | 60/39.282 |
| 5,449,495 | 9/1995 | Goto | 422/111 |
| 5,718,111 | 2/1998 | Ling et al. | 60/39.02 |
| 5,806,052 | 9/1998 | Bonissone et al. | 706/4 |

*Primary Examiner*—Louis J. Casaregola
*Attorney, Agent, or Firm*—Finnegan, Henderson, Farabow, Garrett & Dunner, L.L.P.

[57] ABSTRACT

In a control of a gas turbine having a gas turbine engine, a fuel pump for supplying fuel to the gas turbine engine, a fuel valve, and a motor for driving the fuel pump, the motor or the fuel valve as a subject of control is controlled. (A) The difference between a target torque set by a user and an actual torque of the gas turbine engine is obtained. (B) A fuzzy control value is obtained by executing a fuzzy control algorithm in which the torque difference and a time differential value of the torque difference are set as input variables. (C) A proportional-differential control value is obtained by multiplying the fuzzy control value by a gain set through a simulation in which the fuzzy control value approximates to the proportional-differential control value from the torque difference. (D) An integral control value is obtained from the torque difference. (E) A proportional-integral-differential control value is obtained by adding the proportional-differential control value and the integral control value obtained from the steps (C) and (D), respectively. (F) Driving of the subject of control is controlled according to the proportional-integral-differential control value. (G) The steps (A) through (F) are repeated.

7 Claims, 6 Drawing Sheets

METHOD FOR CONTROLLING GAS TURBINE USING FUZZY LOGIC

BACKGROUND OF THE INVENTION

1. Field of the Invention

The present invention relates to a method for controlling a gas turbine, and more particularly, to a method for controlling a gas turbine by which the gas turbine can maintain a target torque set by a user.

2. Description of the Related Art

In general, a gas turbine consists of a gas turbine engine, a fuel pump which supplies fuel to the gas turbine engine, and a motor which drives the fuel pump. A control system of the gas turbine controls torque of the motor which drives the fuel pump or opening of the fuel valve so that the gas turbine engine can maintain a set torque.

A conventional gas turbine control method is as follows. First, the difference between a target torque set by a user and an actual torque of a gas turbine engine is obtained. A typical proportional-integral-differential control is performed according to the obtained torque difference and thus a subject of the control, i.e., a control signal for driving a motor for a fuel pump or a fuel valve. However, the typical proportional-integral-differential control method has a limit in controlling a gas turbine whose input/output properties are not easily identified.

A fuzzy control method has been suggested to overcome the limitation of the above typical proportional-integral-differential control method. However, the fuzzy control method also shows a limitation in controlling a gas turbine in which the phase of an actual torque signal changes very rapidly.

Accordingly, accuracy, precision and stability are required in controlling a gas turbine in which the input/output properties thereof are difficult to define and a torque signal thereof has a very rapidly changing phase.

SUMMARY OF THE INVENTION

To solve the above problems, it is an objective of the present invention to provide a method for concurrently performing a proportional-integral-differential control and a fuzzy control in controlling a gas turbine.

Accordingly, to achieve the above objective, there is provided a method for controlling a gas turbine having a gas turbine engine, a fuel pump for supplying fuel to the gas turbine engine, a fuel valve, and a motor for driving the fuel pump, in which driving of the motor or the fuel valve as a subject of control is controlled, the method comprising the steps of: (A) obtaining the difference between a target torque set by a user and an actual torque of the gas turbine engine; (B) obtaining a fuzzy control value by executing a fuzzy control algorithm in which the torque difference and a time differential value of the torque difference are set as input variables; (C) obtaining a proportional-differential control value by multiplying the fuzzy control value by a gain set through a simulation in which the fuzzy control value approximates to the proportional-differential control value from the torque difference; (D) obtaining an integral control value from the torque difference; (E) obtaining a proportional-integral-differential control value according to the proportional-differential control value and the integral control value obtained from the steps (C) and (D), respectively; (F) controlling driving of the subject of control according to the proportional-integral-differential control value; and (G) repeating the steps (A) through (F).

The fuzzy control value in the present invention is obtained through the steps of: (B1) searching for the first set range to which the torque difference belongs, within an overall set range in which the torque difference varies, to search for the first membership grade that is a set representative value corresponding to the first set range; (B2) searching for the second set range to which the time differential value belongs, within an overall set range in which the time differential value varies, to search for the second membership grade that is a set representative value corresponding to the second set range; (B3) searching for an output value set by a correlation between the first and second membership grades; (B4) obtaining a membership coefficient according to a correlation between the first and second membership grades; and (B5) obtaining the fuzzy control value proportional to the output value and the membership coefficient.

It is preferable in the present invention that an integral control gain in the step (D) is set by a proportional control gain which is proportional to a gain to be applied in the step (C) and inverse proportional to the overall set range to be applied in the step (B1) and by a differential control gain which is proportional to the gain to be applied in the step (C) and inverse proportional to the overall set range to be applied in the step (B2).

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
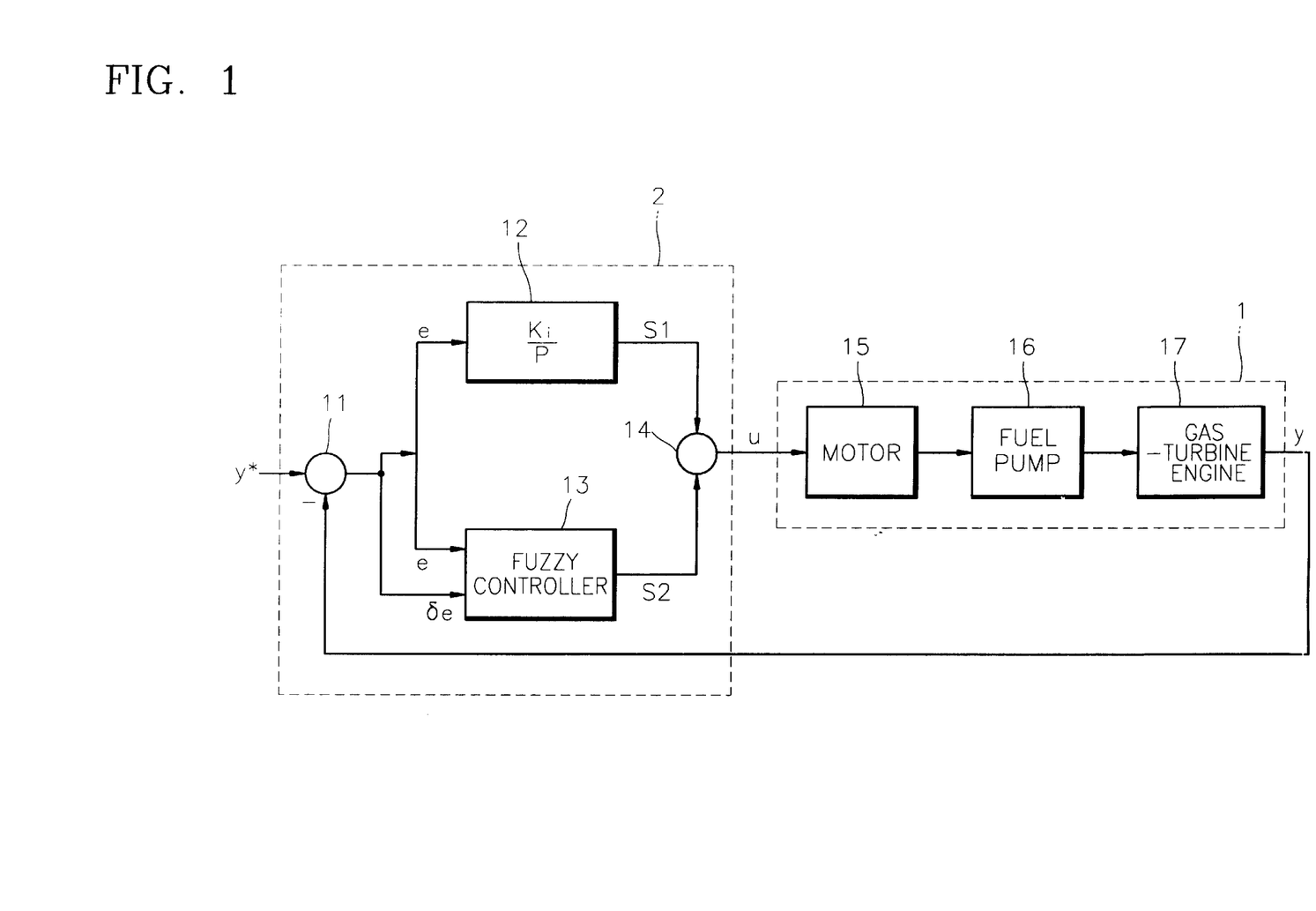
FIG. 1 is a block diagram showing a system for executing a method for controlling a gas turbine according to a preferred embodiment of the present invention.

FIG. 1 shows a system for executing a method for controlling a gas turbine as a subject of control according to a preferred embodiment of the present invention. Referring to FIG. 1, a system 2 for performing a gas turbine control method according to the present invention is a control system for a gas turbine 1. The gas turbine 1 includes a gas turbine engine 17, a fuel pump 16 which supplies fuel to the gas turbine engine 17, and a motor 15 which drives the fuel pump 16. The control system 2 includes a comparator 11, an integral controller 12, a fuzzy controller 13, and an adder 14.

The comparator 11 obtains the difference e between a target torque y* set by a user and an actual torque y of the gas turbine engine 17. The integral controller 12 obtains an integral control value from the torque difference e obtained by the comparator 11. The fuzzy controller 13 executes a fuzzy control algorithm, in which the torque difference e from the comparator 11 and a time differential value δe of the torque difference e are set as input variables, and obtains a proportional-differential control value corresponding to the result of execution. The adder 14 adds an integral control value S1 of the integral controller 12 to a proportional-differential control value S2 of the fuzzy controller 13 and outputs a result signal of the addition as a control signal for driving the motor 15, i.e., a proportional-integral-differential control signal u.

Figure 2:
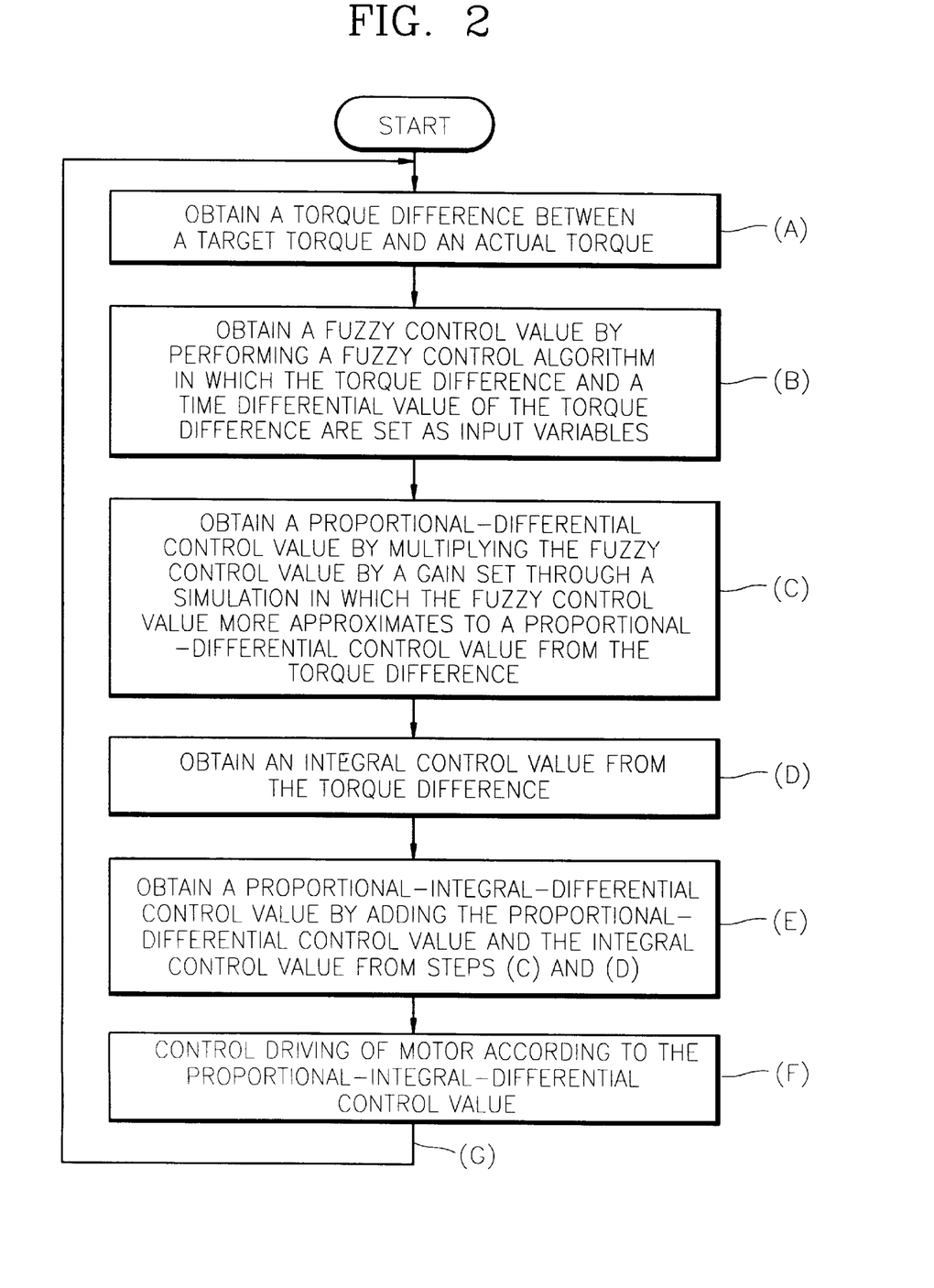
FIG. 2 is a flow chart for explaining a process of the control method in the system shown in FIG. 1.
Figure 3:
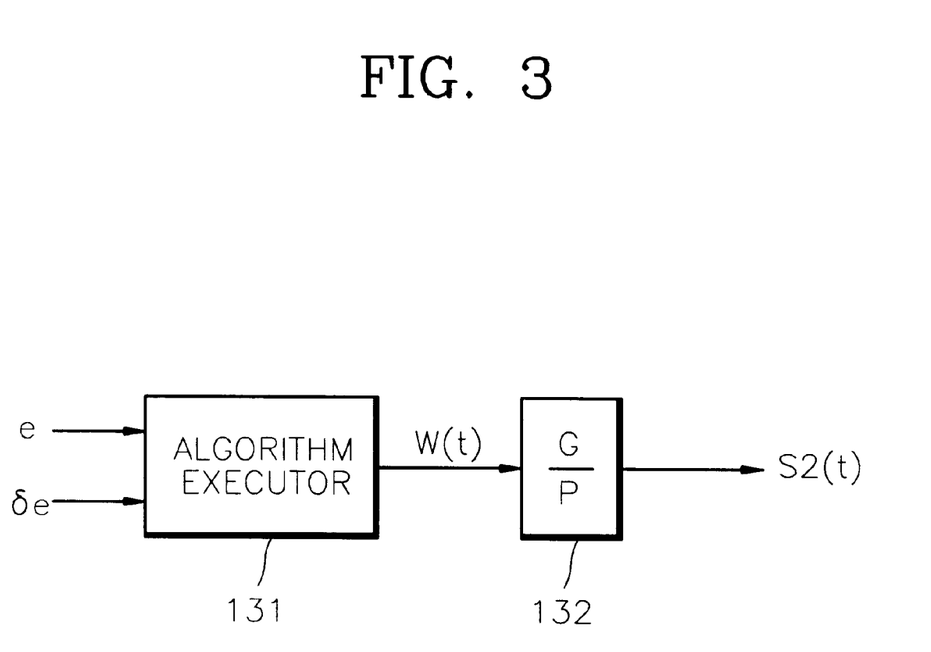
FIG. 3 is a block diagram showing the internal structure of the fuzzy controller shown in FIG. 1.

Referring to FIGS. 1, 2, and 3, a control method performed according to the present invention in the system 2 of FIG. 1 will be described.

The comparator 11 obtains the difference e between a target torque y* set by a user and an actual torque y of the gas turbine engine 17 (step A). An algorithm executor 131 in the fuzzy controller 13 executes a fuzzy control algorithm, in which the torque difference e and a time differential value δe of the torque difference e are set as input variables, to obtain a fuzzy control value ω(t) (step B). Here, t indicates time. An auxiliary integrator 132 in the fuzzy controller 13 multiplies the fuzzy control value ω(t) by a gain G set through a simulation in which the fuzzy control value ω(t) more approximates to a typical proportional-differential control value from the torque difference e to obtain a proportional-differential control value S2 (step C). That is, when a complex variable and a transfer function of the auxiliary integrator 132 are p and G/p, respectively, the following equation is obtained.

$$S2(t) = \frac{G}{p} \cdot \omega(t) \qquad \text{[Equation 1]}$$

When a Z-conversion of discrete time is performed with respect to Equation 1, the following equation is obtained.

$$S2(z) = \frac{G \cdot \omega(z)}{1 - z^{-1}} \qquad \text{[Equation 2]}$$

Equation 2 is the same as the following equation.

$$S2(z) \cdot (1 - z^{-1}) = G \cdot \omega(z) \qquad \text{[Equation 3]}$$

Accordingly, assuming that the number of sampling is n and the period of sampling is T, the following equation is established at the point of $^{nT}$.

$$S2(nT) - S2(nT-T) = G \cdot \omega(nT) \qquad \text{[Equation 4]}$$

Here, S2 (nT) represents the proportional-differential control value at the point of nT; S2 (nT−T) represents the proportional-differential value at the point of nT−T; and ω(nT) represents the fuzzy control value at the point of nT. When Equation 1 is summarized with respect to $^{S2(nT)}$, the following equation is obtained.

$$S2(nT) = S2(nT-T) + G \cdot \omega(nT) \qquad \text{[Equation 5]}$$

The integral controller 12 obtains the integral control value S1 from the value obtained by multiplying the torque difference e by a gain $$\frac{Ki}{p}$$

(step D). The adder 14 adds the integral control value S1 from the integral controller 12 to the proportional-differential control value S2 from the fuzzy controller 14 and obtain a proportional-integral-differential control value u (step E). The driving of the motor 15 is controlled according to a proportional-integral-differential control value u (step F). The above all steps are repeated (step G).

Figure 4:
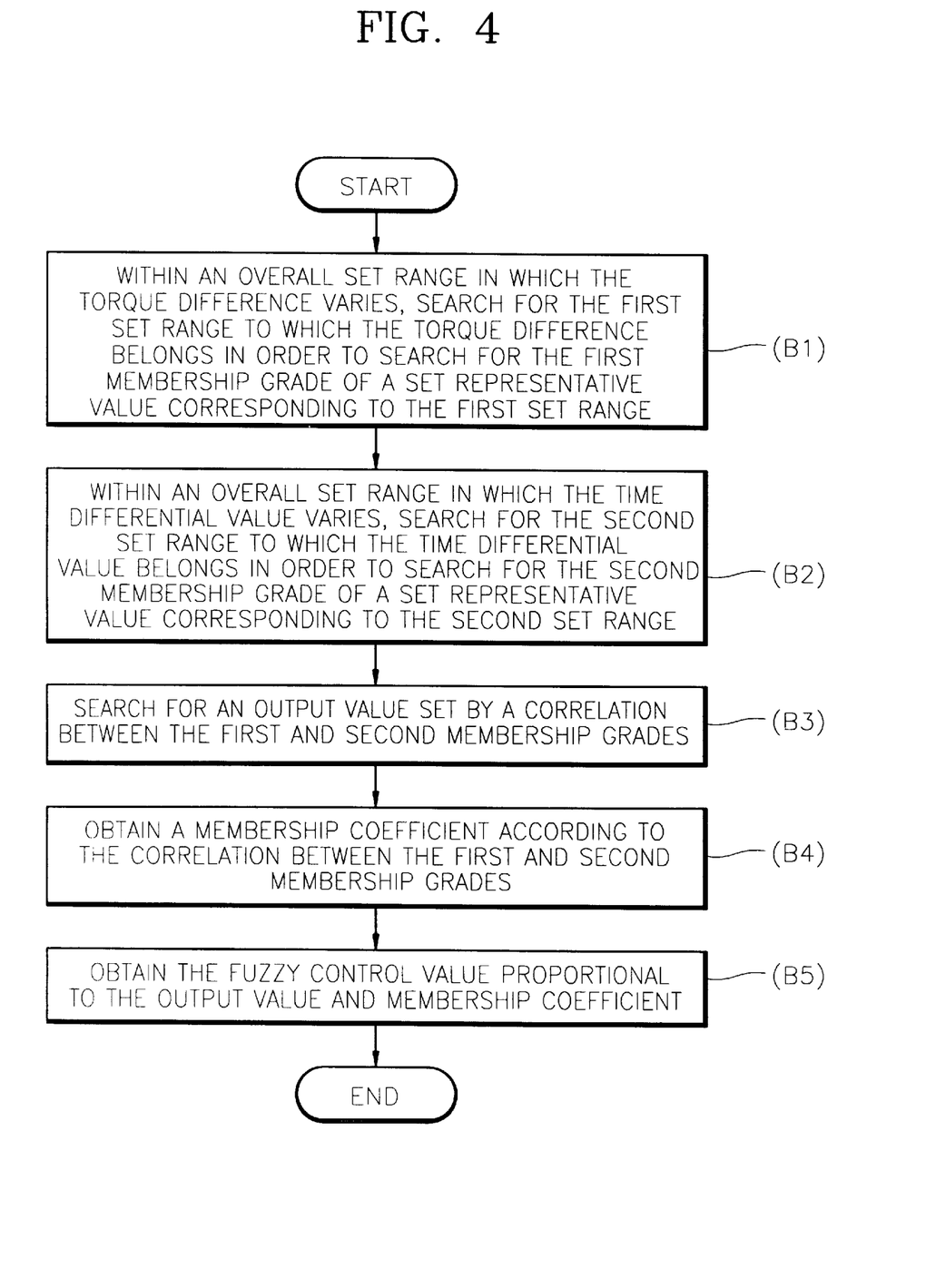
FIG. 4 is a flow chart showing a fuzzy control algorithm executed by the algorithm executor of the fuzzy controller of FIG. 3.

Next, with reference to FIGS. 3 and 4, a fuzzy control algorithm executed by the algorithm executor 131 of the fuzzy controller of FIG. 2 will be described.

First, the first set range to which a currently input torque difference e(nT) belongs is searched for, within the overall set range in which the torque difference e varies, to search for the first membership grade that is a setting representative value corresponding to the first set range (step B1). Also, the second set range to which a currently input time differential value δ(nT) belongs is searched for, within the overall set range in which the time differential value ω varies, to search for the second membership grade that is a setting representative value corresponding to the second set range (step B2).

Next, a set output value according to the correlation between the searched first and second membership grades is searched for (step B3). A membership coefficient is obtained according to correlation of the first and second membership grades (step B4). The fuzzy control value ω(t) which is proportional to the searched output value and the obtained membership coefficient is obtained (step B5).

When the fuzzy control algorithm is executed using the torque difference e(t) and the time differential δe as input variables as above (step B of FIG. 2), it can be seen that the obtained fuzzy control value ω(t) approaches the typical proportional-integral-differential control value. Also, by multiplying the fuzzy control value ω(t) by the gain G set through a simulation, a value S2(t) more approaching the typical proportional-differential control value can be obtained. However, according to the simulation, the fuzzy control itself cannot provide a stabler control property than the typical proportional-differential control. The above problem is removed by adding the integral control value from the torque difference e to the proportional-differential control value S2(t) by the fuzzy control. That is, by appropriately setting the gain Ki of the integral controller 12 with respect to a virtual proportional gain and differential gain of the fuzzy controller 13, a proportional-integral-differential control value u(t) exhibiting a very superior property can be obtained. A process of setting the gain Ki of the integral controller 12 is described as follows.

The proportional-differential-integral control value u from the adder 14 equals the result of addition of the integral control value S1 of the integral controller 12 and the control value S2 of the fuzzy controller 14, which is expressed as the following equation.

$$u = S1 + S2 \qquad \text{[Equation 6]}$$

A z-conversion function S1(2) with respect to the integral control value S1 from the integral controller 12 is set by the following equation.

$$SI(z) = \frac{k_i \cdot e(z)}{(1 - z^{-T})} \qquad \text{[Equation 7]}$$

Here, $k_i$ represents the gain of the integral controller 12; $e(z)$ represents the torque difference from the comparator 11; z represents the z-operator; and T represents a sampling period.

When Equation 7 is substituted and summarized with respect to Equation 6, the following equation is obtained.

$$u(z) = S2 + \frac{k_i \cdot e(z)}{(1 - z^{-T})} \qquad \text{[Equation 8]}$$

The following equation is obtained by summarizing Equation 8.

$$u(z) \cdot (1-z^{-T}) = S2 \cdot (1-z^{-T}) + k_i e(z) \qquad \text{[Equation 9]}$$

Thus, assuming that the number of sampling is n, the function of an output value u(nT) from the adder 14 at the point of $(^{n \cdot T})$ is expressed as follows.

$$u(nT) = u(nT-T) + S2(nT) - S2(nT-T) + k_i \cdot e(nT) \qquad \text{[Equation 10]}$$

Here, u(nT−T) represents the proportional-differential-integral control value from the adder 14 at the point of (n·T−T); S2(nT) represents the proportional-differential-integral control value from the fuzzy controller 13 at the point of (n·T); S2(nT−T) represents the proportional-differential-integral control value from the fuzzy controller 14 at the point of (n·T−T); and e(nT) represents the torque difference at the point of (n·T).

When a virtual, proportional control gain, a differential control gain, and complex variable of the fuzzy controller 13 are $K_p$, $K_d$, and p, respectively, the transfer function of the fuzzy controller 13 is $K_p + K_d \cdot p$. Also, the transfer function of the integral controller 12 is k/p. To stabilize the system, the transfer function D should have positive real-numbered roots α and β to the complex variable p, which is expressed as the following equation.

$$D = K_p + K_d \cdot s + k_i/s = \frac{(s+\alpha)(s+\beta)}{s} \qquad \text{[Equation 11]}$$

Equation 11 is summarized into the first equation, $K_p = (\alpha + \beta) \cdot K_d$, and the second equation, $K_i = \alpha \cdot \beta \cdot K_d$. If the first equation is summarized to β, the following equation 12 is obtained.

$$\beta = K_p | K_d - \alpha \qquad \text{[Equation 12]}$$

When Equation 12 is substituted and summarized with respect to Equation 2, the following equation is obtained.

$$k_i = \alpha \cdot K_p - \alpha^2 \cdot K_d \qquad \text{[Equation 13]}$$

The root of a quadratic equation of Equation 13 is obtained from the following equation.

$$\alpha = \frac{K_p \pm \sqrt{K_p^2 - 4K_d K_i}}{2K_d} = \frac{K_p \pm \sqrt{A}}{2K_d} \qquad \text{[Equation 14]}$$

Here, A is $K_p^2 - 4K_d K_i$.

In Equation 14, if α is a positive real number, A should be equal to a square of a real number R greater than zero. That is, an equation that $K_p^2 - 4K_d K_i = R^2$ should be established. When the above equation is summarized with respect to $k_i$, the following equation is obtained.

$$k_i = \frac{K_p^2 - R^2}{4K_d} \qquad \text{[Equation 15]}$$

When R is a real number greater than zero in Equation 15, the following equation is obtained.

$$k_i \leq \frac{K_p^2}{4K_d} \qquad \text{[Equation 16]}$$

Thus, a proportional control gain $K_p$ and a differential control gain $K_d$ of the fuzzy controller 13 are set so that Equation 15 and Equation 16 can be established. Accordingly, there are several integral control gains $k_i$ of the integral controller 12 to establish Equations 15 and 16. By performing a simulation in this connection, it can be seen that it is preferable to select the maximum value among the several integral control gains $k_i$. Therefore, the value of $R_2$ should be zero in order to select the maximum value among the several integral control gains $k_i$. That is, when the proportional control gain of the fuzzy controller 13 and the differential control gain of the fuzzy controller 13 are $K_p$ and $K_d$, respectively, the integral control gains $k_i$ of the integral controller 12 is set according to the following equation.

$$k_i = \frac{K_p^2}{4K_d} \qquad \text{[Equation 17]}$$

Here, to calculate the integral control gain $k_i$ of the integral controller 12, a virtual proportional control gain $K_p$ of the fuzzy controller 13 and a virtual differential control gain $K_d$ of the fuzzy controller 13 should be set. According to the simulation, it is most appropriate to set the virtual proportional control gain $K_p$ of the fuzzy controller 13 to be proportional to the gain G of the auxiliary integrator 132 and inversely proportional to the overall set range to be applied in step B1. It is also most appropriate to set the virtual differential control gain $K_d$ of the fuzzy controller 13 to be proportional to the gain G of the auxiliary integrator 132 and inversely proportional to the overall set range to be applied in step B1.

According to the algorithm above, the integral control gain $k_i$ of the integral controller 12, the proportional control gain $K_p$ of the fuzzy controller 13, and the differential control gain $K_d$ of the fuzzy controller 13 are set so that a stable control performance can be obtained as the proportional-integral-differential control and the fuzzy control are simultaneously performed.

Figure 5A:
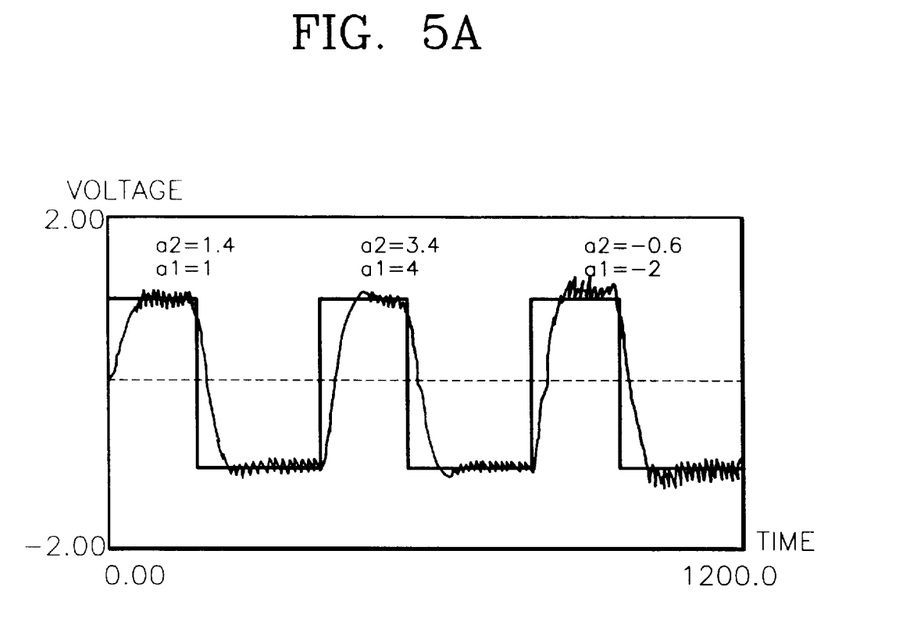
FIG. 5A is a waveform diagram of a detection signal corresponding to an actual torque of a gas turbine engine when a typical proportional-integral-differential control is performed.
Figure 5B:
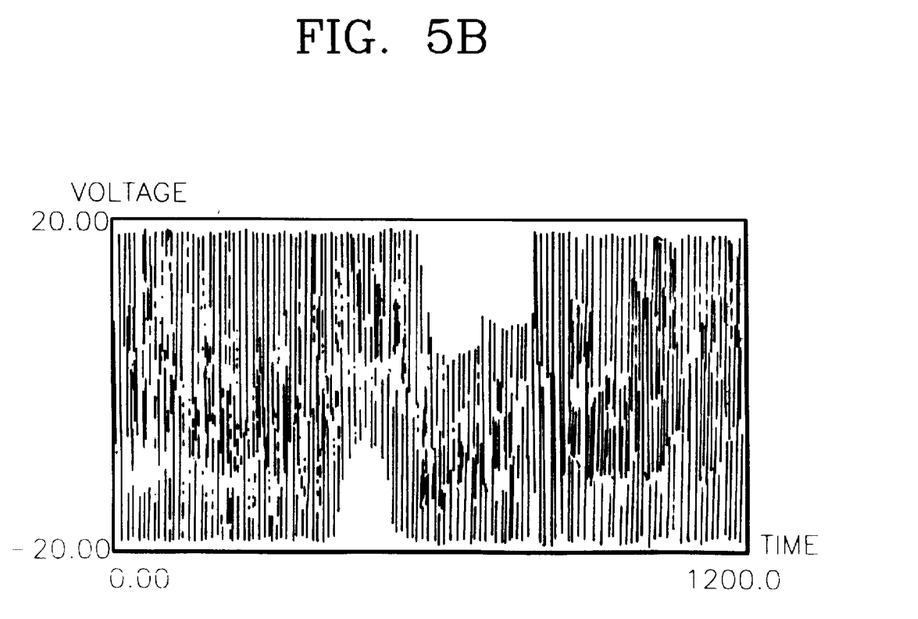
FIG. 5B is a waveform diagram of a driving control signal corresponding to a control value when the typical proportional-integral-differential control is performed.
Figure 6A:
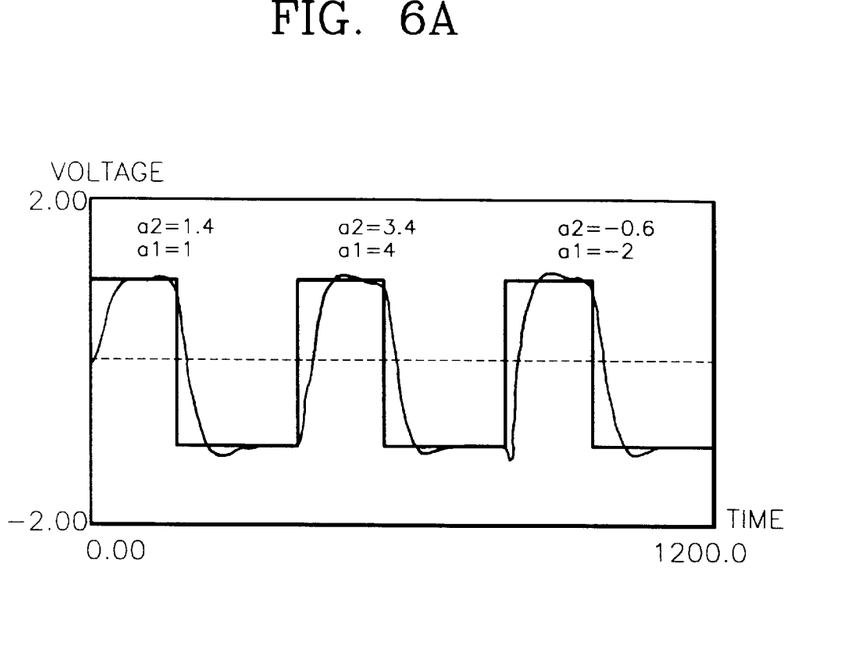
FIG. 6A is a waveform diagram of a detection signal corresponding to an actual torque of a gas turbine engine when a control according to a preferred embodiment of the present invention is performed.
Figure 6B:
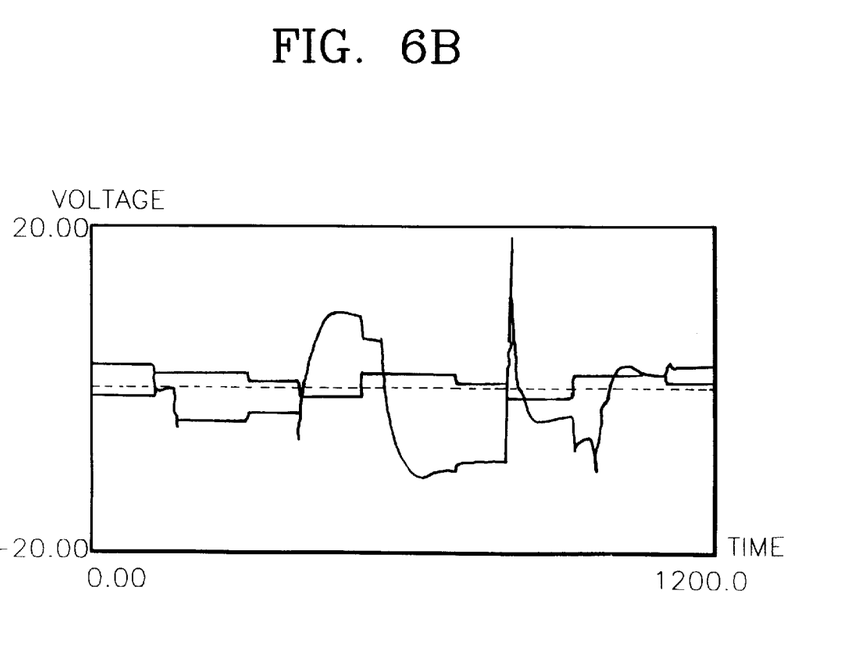
FIG. 6B is a waveform diagram of a driving control signal corresponding to a control value when the control according to a preferred embodiment of the present invention is performed.

FIG. 5A shows an unstable waveform of a detection signal corresponding to an actual torque y of the gas turbine engine 17 when a typical proportional-differential-integral control is performed. FIG. 5B shows an unstable waveform of a driving control signal corresponding to a control value u when a typical proportional-differential-integral control is performed. FIG. 6A shows a stable waveform of a detection signal corresponding to an actual torque y of the gas turbine engine 17 when a control according to a preferred embodiment of the present invention is performed. FIG. 6B shows a stable waveform of a driving control signal corresponding to a control value u when the control according to a preferred embodiment of the present invention is performed.

The control method of the above-described embodiment can be equally applied to the fuel valve which is a subject of control instead of the motor for driving a fuel pump.

As described above, in the motor control system according to the present invention, since a proportional-integral-differential control and a fuzzy control can be simultaneously performed, accuracy, precision and stability in controlling are improved for cases in which input/output properties of a motor-applied apparatus are difficult to define and a torque signal has a very rapidly changing phase.

It is noted that the present invention is not limited to the preferred embodiment described above, and it is apparent that variations and modifications by those skilled in the art can be effected within the spirit and scope of the present invention defined in the appended claims.

What is claimed is:

1. A method for controlling a gas turbine having a gas turbine engine, a fuel pump for supplying fuel to the gas turbine engine, a fuel valve, and a motor for driving the fuel pump, in which driving of said motor or said fuel valve as a subject of control is controlled, the method comprising the steps of:

(A) obtaining the difference between a target torque set by a user and an actual torque of the gas turbine engine;

(B) obtaining a fuzzy control value by executing a fuzzy control algorithm in which the torque difference and a time differential value of the torque difference are set as input variables;

(C) obtaining a proportional-differential control value by multiplying the fuzzy control value by a gain set through a simulation in which the fuzzy control value approximates to the proportional-differential control value from the torque difference;

(D) obtaining an integral control value from the torque difference;

(E) obtaining a proportional-integral-differential control value according to the proportional-differential control value and the integral control value obtained from said steps (C) and (D), respectively;

(F) controlling driving of said subject of control according to the proportional-integral-differential control value; and (G) repeating said steps (A) through (F).

2. The method as claimed in claim 1, wherein said fuzzy control algorithm in said step (B) comprises the steps of:

(B1) searching for the first set range to which said torque difference belongs, within an overall set range in which said torque difference varies, to search for the first membership grade that is a set representative value corresponding to said first set range;

(B2) searching for the second set range to which said time differential value belongs, within an overall set range in which said time differential value varies, to search for the second membership grade that is a set representative value corresponding to said second set range;

(B3) searching for an output value set by a correlation between said first and second membership grades;

(B4) obtaining a membership coefficient according to a correlation between said first and second membership grades; and (B5) obtaining said fuzzy control value proportional to said output value and said membership coefficient.

3. The method as claimed in claim 2, wherein an integral control gain in said step (D) is set by a proportional control gain which is proportional to a gain to be applied in said step (C) and inversely proportional to the overall set range to be applied in said step (B1) and by a differential control gain which is proportional to the gain to be applied in said step (C) and inversely proportional to the overall set range to be applied in said step (B2).

4. The method as claimed in claim 3, wherein said integral control gain in said step (D) is $$\frac{K_p^2}{4K_d}$$

when said proportional control gain is $K_p$ and said differential control gain is $K_p$.

5. A method of controlling an engine having a motor which drives a fuel pump and having a fuel valve, said method comprising:

calculating a torque difference between a predetermined target engine torque and an actual engine torque;

developing a proportional-integral-differential control value, including
calculating an integral control value from the torque difference,
calculating a proportional-differential control value using a fuzzy control algorithm, and
adding said integral and proportional-differential control values; and controlling one of said motor and said fuel valve in accordance with the proportional-integral-differential control value.

6. The method as claimed in claim 5, wherein said step of calculating a proportional-differential control value includes:

developing a fuzzy control value from the torque difference and a time differential torque difference; and multiplying the fuzzy control value by a gain obtained by simulation of a typical proportional-differential control value.

7. The method as claimed in claim 6, wherein said step of developing a fuzzy control value includes:

finding first and second set ranges to which the torque difference and a time differential torque difference respectively belong;

finding first and second membership grades corresponding to said first and second set ranges; and determining the fuzzy control value from first and second membership grades.

* * * * *